United States Patent
Yamamoto et al.

(10) Patent No.: US 6,578,684 B2
(45) Date of Patent: Jun. 17, 2003

(54) DRIVING FORCE TRANSMISSION DEVICE

(75) Inventors: Masaji Yamamoto, Okazaki (JP);
Hiroshi Takuno, Nukata-gun (JP);
Hideyuki Saito, Kariya (JP); Takashi Hosokawa, Kariya (JP); Yoshiaki Senga, Chiryu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/917,619

(22) Filed: Jul. 31, 2001

(65) Prior Publication Data

US 2002/0033311 A1 Mar. 21, 2002

(30) Foreign Application Priority Data

Aug. 1, 2000 (JP) .................................... 2000-233330

(51) Int. Cl.[7] ............................................. F16D 27/115
(52) U.S. Cl. ...................... 192/35; 192/84.7; 192/84.91
(58) Field of Search ............................... 192/35, 54.52, 192/84.7, 84.91

(56) References Cited

U.S. PATENT DOCUMENTS 3,854,562 A * 12/1974 Wilczewski ............. 192/110 B
5,713,446 A * 2/1998 Organek et al. ............ 192/35
5,954,173 A * 9/1999 Sakai et al. ................ 192/35
6,109,408 A * 8/2000 Ikeda et al. ................ 192/35
6,158,561 A * 12/2000 Sakai et al. ............. 192/107 M
6,206,159 B1 * 3/2001 Takuno et al. .......... 192/110 B
6,343,681 B1 * 2/2002 Aoki .......................... 192/35

* cited by examiner

Primary Examiner—Richard M. Lorence
Assistant Examiner—Eric M Williams
(74) Attorney, Agent, or Firm—Oblon, Spivak, McClelland, Maier & Neustadt, P.C.

(57) ABSTRACT

A driving force transmission device transmits driving force between an outer case made of magnetic substance and inner shaft. A main clutch mechanism, an electromagnetic type pilot clutch mechanism and cam mechanism are arranged between the outer case and inner shaft. The main clutch mechanism transmits driving force between the outer case and inner shaft. The pilot clutch mechanism controls operation of the main clutch mechanism and comprises an electromagnet, an armature and a friction clutch. The cam mechanism amplifies output of the pilot clutch mechanism and transmits amplified output to the main clutch mechanism. The driving force transmission device further comprises a first regulation member and/or a second regulating member. The first regulating member adjusts a clearance between the cam mechanism and the armature to be more than a predetermined distance. The second regulating member adjusts an axial position of the friction clutch.

22 Claims, 5 Drawing Sheets

DRIVING FORCE TRANSMISSION DEVICE

INCORPORATION BY REFERENCE

The disclosure of Japanese Patent Application No. 2000-233330 filed on Aug. 1, 2000 is incorporated herein by reference in its entirety.

BACKGROUND OF THE INVENTION

1. Field of the Invention

This invention relates to a driving force transmission device, more particularly, to such a device that is arranged between two shafts and is able to connect/disconnect the shafts transmittable driving force therebetween.

2. Description of the Related Art

As an example of the related art, a driving force transmission device as followings is known. The driving force transmission device consists of a main clutch mechanism, an electromagnetic type pilot clutch and a cam mechanism, which are arranged between a outer case and an inner shaft coaxially and rotatably supported in the outer case. At the driving force transmission device, operating force output from the pilot clutch is amplified by the cam mechanism and transmitted to the main clutch mechanism, so that the main clutch mechanism is operated. As a result, the outer case and the inner shaft are connected to be able to transmit torque.

In the aforementioned driving force transmission device of the related art, the pilot clutch consists of an electromagnet, an armature and a friction clutch. When current is applied to an electromagnetic coil of the electromagnet, magnetic flux is established around the electromagnet through the friction clutch and the armature. As a result, the armature is attracted toward electromagnet so that the friction clutch is engaged. Then the cam mechanism is operated by friction engaging force of the friction clutch, whereby the main clutch mechanism is engaged.

Since the friction engaging force of the friction clutch is controlled according to current quantity applying to the electromagnetic coil of the electromagnet, it is required to control correctly the friction engaging force that leakage of the magnetic flux from the outer case possibly can be prevented. As one of the means to prevent the leakage of the magnetic flux, a non-magnetic substance such as aluminum alloy is used for a material of the outer case.

However, axial spline to connect the outer case with an output shaft are needed for mounting the driving force transmission device on a vehicle. When a flange formed the axial spline cannot be attached with the outer case because of space restriction, an outer case that is made of steel such as S15C and integrally formed the axial spline should be adapted. In a case of adapting the steel outer case, an intermediate portion of the steel outer case is formed by nonmagnetic substance such as stainless steel to prevent the leakage of the magnetic flux. Such a special forming as integrally forming of steel and stainless brings difficult operations of forming and high costs.

SUMMARY OF THE INVENTION

In view of the foregoing, an object of the present invention is to prevent the above mentioned problems, namely to prevent the leakage of the magnetic flux through the outer case and control an operation of the pilot clutch correctly even if an outer case is made of only steel.

In order to achieve the above object, the present invention provides a driving force transmission device, which transmits driving force between two rotary members. The driving force transmission device comprises: an outer case; an inner shaft; a main clutch mechanism; an electromagnetic type pilot clutch mechanism; and a cam mechanism. The outer case is connected to the one rotary member and made of magnetic substance. The inner shaft is connected to the other rotary member and arranged into the outer case. The main clutch mechanism transmits driving force between the outer case and the inner shaft. The electromagnetic type pilot clutch mechanism controls operation of the main clutch mechanism, and comprises an electromagnet, an armature and a friction clutch. The cam mechanism amplifies output of the pilot clutch mechanism and transmits amplified output to the main clutch mechanism.

According to a first aspect of the present invention, the driving force transmission device further comprises a first regulating member, which adjusts a clearance between the cam mechanism and the armature to be more than a predetermined distance, and is made of nonmagnetic substance.

Since the clearance between the armature of the pilot clutch mechanism and the cam mechanism is kept more than the predetermined distance to dispose the first regulator, leakage of the magnetic flux through the outer case is avoid even if the outer case is made of steel. Therefore, failures of the attracting the armature that are caused by the leakage of the magnetic flux can be avoided so that the pilot clutch mechanism is maintained to operate well.

According to a second aspect of the present invention, the driving force transmission device further comprises a second regulating member, which adjusts an axial position of the friction clutch.

Since the axial position of the friction clutch is adjusted to push outer and inner clutch plates consisted the friction clutch each other, each distance between the outer clutch plates and the inner clutch plates is adjusted correctly. Therefore, failures of the attracting the armature that is caused by variations of clearances between the outer clutch plates and the inner clutch plates can be avoided.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings.

Figure 1:
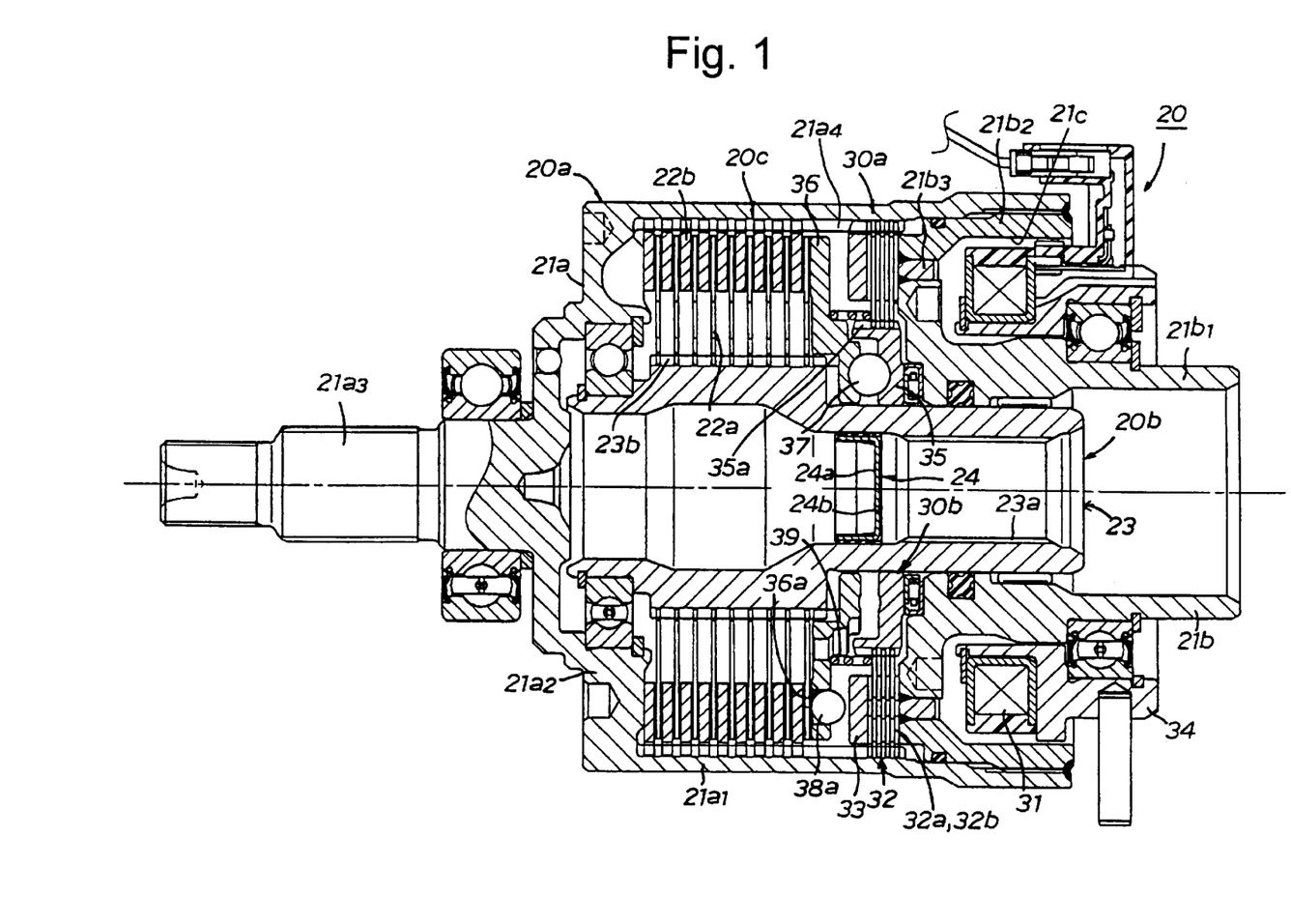
FIG. 1 is a cross-sectional view showing a driving force transmission device according to a first embodiment of the present invention.

FIG. 1 shows a driving force transmission device 20 according to a first embodiment of the present invention. The driving force transmission device 20 is mounted on a driving force transmitting way to a rear wheels side of a four-wheel drive vehicle that is based on front wheels driving, and to control driving force transmitted to the rear wheels side, as shown FIG. 2.

Figure 2:
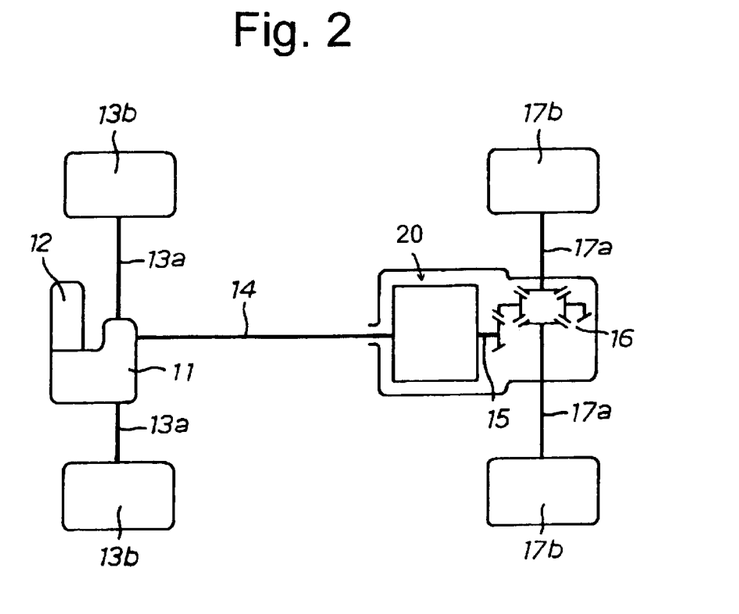
FIG. 2 is a general diagram showing a four-wheel drive vehicle in which a driving force transmission device is installed.

At the four-wheel drive vehicle, a transaxle 11, that contains a transmission, a transfer and a front differential, transmits driving force from an engine 12 to a pair of axle shafts 13a to drive a pair of front wheels 13b via the front differential of the transaxle 11, and transmits driving force to a propeller shaft 14. The propeller shaft 14 is connected to a drive-pinion shaft 15 via the driving force transmission device 20. When the propeller shaft 14 is connected to the drive-pinion shaft 15 to be able to transmit torque, driving force from the engine 12 is transmitted to a pair of axle shafts 17a via rear differential 16 and drives a pair of rear wheels 17b.

The driving force transmission device 20, that is disposed between the propeller shaft 14 and the drive-pinion shaft 15, comprises basically an outer case 20a, an inner shaft 20b, a main clutch mechanism 20c, a pilot clutch mechanism 30a and a cam mechanism 30b, as shown FIG. 1.

The outer case 20a consists of a cup shape housing 21a and a rear cover 21b that is screwed into an opening of the housing 21a to close the opening. The housing 21a is made of steel that is a magnetic substance (for example S15C), and is formed integrally with a main portion 21a1, a front cover 21a2 that is disposed on the front of the main portion 21a1 and a connecting portion 21a3 that is disposed on the front of the front cover 21a2. The propeller shaft 14 is jointed the connecting portion 21a3. The rear cover 21b consists of an inner and an outer cylindrical portion 21b1, 21b2, and intermediate cylindrical portion 21b3 that is secured between the inner and the outer cylindrical portion 21b1, 21b2 by welding. The inner and the outer cylindrical portion 21b1, 21b2 are made of steel that is a magnetic substance, and the intermediate cylindrical portion 21b3 is made of stainless steel that is a nonmagnetic substance.

The inner shaft 20b is inserted coaxially into the housing 21a of the outer case 20a fluid-tightly through a center portion of the rear cover 21b, and rotatably and axial immovably supported by the housing 21a and the rear cover 21b. Plural inner clutch plates 22a, that constitute the main clutch mechanism 20c, are assembled on the inner shaft 20b. An end portion of the drive-pinion shaft 15 is inserted into a hole formed at one end of the inner shaft 20b, and the inner shaft 20b is connected to be able to transmit torque to the drive-pinion shaft 15.

The inner shaft 20b consists of a hollow shaft 23 formed a through hole and a cap 24 that is inserted therein so as to separate an inner surface of the hollow shaft 23 into two portions. Inward spline 23a to engage the drive-pinion shaft 15 are formed on an inner surface of one separated portion of the hollow shaft 23, and outward spline 23b to engage the inner clutch plates 22a are formed on an outer surface of the other separated portion of the hollow shaft 23. The cap 24 consists of a cup shape cap body 24a made of metal and a cover portion 24b made of rubber that is stuck on outer surface of the cap body 24a. The cap 24 is secured into a center of the through hole of the hollow shaft 23, and separates fluid-tightly the through hole into two holes.

The main clutch mechanism 20c, that is a wet type multi-disk friction clutch, is disposed in a bottom portion of the housing 21a and consists of plural clutch plates that are inner clutch plates 22a and outer clutch plates 22b. Each inner clutch plates 22a is assembled to the inner shaft 20b so as to engage to the outward spline 23b thereof and to be able to move axial direction. Each outer clutch plate 22b is assembled to the housing 21a so as to engage inward spline 21a4 that is formed on inner surface of the housing 21a, and to be able to move axial direction. The inner clutch plates 22a and the outer clutch plates 22b are arranged to alternate each other. Therefore, the inner clutch plates 22a and the outer clutch plates 22b are frictionally engaged with each other when these are contacted, and are brought into a free state when these are not contacted.

The pilot clutch mechanism 30a, that is electromagnetic type clutch, consists of an electromagnet 31, a friction clutch 32, an armature 33 and a yoke 34. The electromagnet 31 shaped ring is fitted into a ring shape depression 21c in a condition of being attached to the yoke 34. The rear cover 21b is assembled to be able to rotate relative to the yoke 34 attaching the electromagnet 31 with a clearance.

The friction clutch 32, that is a wet type multi-disk frictional clutch, consists of plural outer clutch plate 32a and plural inner clutch plate 32b. Each outer clutch plate 32a is assembled to the housing 21a so as to engage inward spline 21a4 and to be able to move axial direction. Each inner clutch plates 32b is assembled to the cam mechanism 30b so as to engage outward spline 35a, that is formed on a first cam member 35 (will be described later) of the cam mechanism 30b, and to be able to move axial direction. The outer clutch plates 32a and inner clutch plates 32b are arranged to alternate each other. Therefore, the outer clutch plates 32a and the inner clutch plates 32b are fictionally engaged with each other when these are contacted, and are brought into a free state when these are not contacted. In front of the friction clutch, the armature 33 of the pilot clutch mechanism 30a is disposed. The armature 33, that is shaped ring, is assembled to the housing 21a so as to engage to the inward spline 21a4 and to be able to move axial direction.

The cam mechanism 30b, that is disposed between the main clutch mechanism 20c and the pilot clutch mechanism 30a, consists of a first cam member 35, a second cam member 36 and plural cam-followers 37 (only one cam-follower is shown). The first cam member 35 is rotatably supported on the rear cover 21b, and arranged between the inner shaft 20b and the friction clutch 32. The second cam member 36 is supported on the inner shaft 20b to be able to move axial direction and to be not able to rotate, and disposed between the armature 33, the first cam mechanism 35 and the main clutch mechanism 20c. Each cam follower 37, that is shaped spherically, is arranged between the first cam member 35 and the second cam member 36 in a condition of engaging with ball grooves that are formed on opposite surfaces of each cam member 35, 36.

In addition to the above described structure, as characteristic structures of the present invention, plural balls 38a as a first regulating member and a coil spring 39 as a second regulating member are disposed between the pilot clutch mechanism 30a and the cam mechanism 30b. The balls 38a and the coil spring 39 are made of nonmagnetic substance such as stainless steel. Each ball 38a is disposed into an each ball hole 36a that is formed on an outer portion of the second cam member 36 concentrically, and is opposed to the armature 33. Thereby, a clearance between the second cam member 36 and the armature 33 is kept more than a predetermined distance. That is, the balls 38a avoid separating the armature 33 from the friction clutch 32. On the other hand, the coil spring 39 is disposed between the second cam member 36 and a most left inner clutch plate 32b of the friction clutch 32 so as to act small preload to the friction clutch 32. Thereby, each clearance between the outer clutch plate 32a and the inner clutch plate 32b is adjusted and variations of the clearances are corrected.

At above described driving force transmission device 20, when current is not supplied to an electromagnetic coil of the electromagnet 31, magnetic flux is not established, so that the frictional clutch 32 does not be engaged. In such a state, the pilot clutch mechanism 30a is non-operation state, so that the first cam member 35 can rotate with the second cam member 36 through the cam follower 37, and the main clutch mechanism 20c is kept non-operation state. Therefore, the vehicle is operated by front wheel drive.

On the other hand, when the current is supplied to the electromagnetic coil of the electromagnet 31, magnetic flux is established around the electromagnetic through the yoke 34, rear cover 21b, the friction clutch 32 and the armature 33, whereby the armature 33 is magnetically attracted toward the electromagnet 31. Therefore, the armature 33 pushes the friction clutch 32 so that the friction clutch 32 is engaged. As a result, pilot torque is generated at the pilot clutch mechanism 30a, so that the first cam member 35 and the second cam member 36 are relatively rotate. Thereby the second cam member 36 pushes the main clutch mechanism 20c by an operation of the cam followers 37 and the ball grooves. Then the main clutch mechanism 20 is engaged according to friction engaging force of the friction clutch 32 so that driving force is transmitted between the outer case 20a and the inner shaft 20b. Therefore, the vehicle is operated by four-wheel drive to connect the propeller shaft 14 with the drive-pinion shaft 15. In a condition of this four-wheel drive, driving force transmitted to rear wheel side can be controlled between more than zero percent and less than fifty percent of output of the engine.

Further, when current supplying to the electromagnetic coil of the electromagnet 31 is increased to a predetermined quantity, magnetically attracting force to the armature 33 is gained so that friction engaging force of the friction clutch 32 is gained and relative rotational quantity between the first cam member 35 and the second cam member 36 is increased. As a result, pushing force, that the second cam member 36 pushes the main clutch mechanism 20c, is gained so that the main clutch mechanism 20c is connected perfectly. Therefore, the vehicle is operated by four-wheel drive that is in a condition of the propeller shaft 14 is perfectly connected with the drive-pinion shaft 15, that is, driving force transmitted to rear wheel side is fifty percent of output from the engine.

Figure 3:
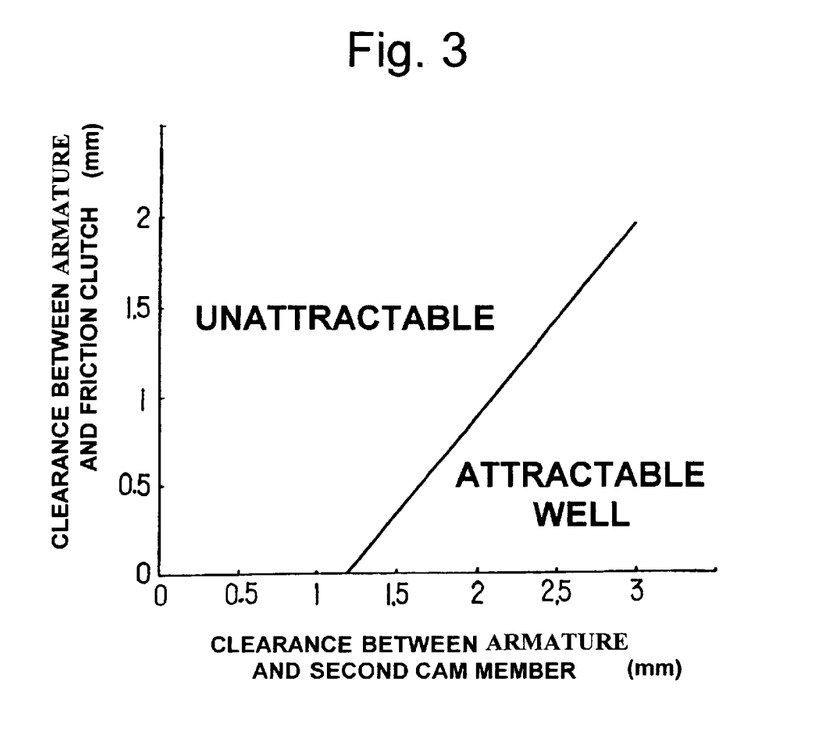
FIG. 3 is graph showing a result of an experiment about attracting an armature.

Here, FIG. 3 is a graph showing a result of an experiment about attracting the armature 33. The graph shows relationship between the two clearances, one is the clearance between the armature 33 and the second cam member 36, and the other is the clearance between the armature 33 and the friction clutch 32. In the graph, a right area of the graph indicates to be able to attract the armature 33 well, and a left area of the graph indicates to be not able to attract the armature 33 because of leakage of magnetic flux, when current is supplied to the magnetic coil of the electromagnet 31. The result of the experiment means that leakage of magnetic flux can be avoid to adjust the clearances. According to the result of the experiment, at the embodiment, aforementioned two clearance is kept to be in the right area of the graph that the armature 33 can be attracted well by disposing the balls 38a between the second cam member 36 and the armature 33.

According to the above described driving force transmission device 20, since the clearance between the armature 33 of the pilot clutch mechanism 30a and the second cam member 36 is kept more than a predetermined distance to dispose the balls 38a as the first regulator, leakage of the magnetic flux from the armature 33 to the second cam member 36 through the outer case 20a is avoid even if the outer case 20a is made of steel. Therefore, failures of the attracting the armature 33 that are caused by the leakage of the magnetic flux can be avoided so that the pilot clutch mechanism 30a is maintained to operate well.

Further, according to the above described driving force transmission device, since small preload is given to the friction clutch 32 to push the outer and inner clutch plate 32a, 32b each other, each distance between outer clutch plates 32a and inner clutch plates 32b of the friction clutch 32 is adjusted correctly. Therefore, failures of the attracting the armature 33 that is caused by variations of clearances between the outer clutch plates 32a and inner clutch plates 32b can be avoided.

Moreover, when such small quantity current as to be not able to attract the armature 33 is supplied to the electromagnetic coil of the electromagnet 31, small magnetic flux around the electromagnet 31 through the yoke 34, rear cover 21b and the friction clutch 32 can be established, because the outer and inner clutch plates 32a, 32b are positioned close together by the preload acting to the friction clutch 32. Therefore, friction clutch 32 can be engage by small force according to small current quantity supplied to the electromagnetic coil of the electromagnet 31.

FIGS. 4–8 show other embodiments of the present invention. In these FIGURES, only each different fragment is shown and other constructions that are similar to the first embodiment are omitted.

Figure 4:
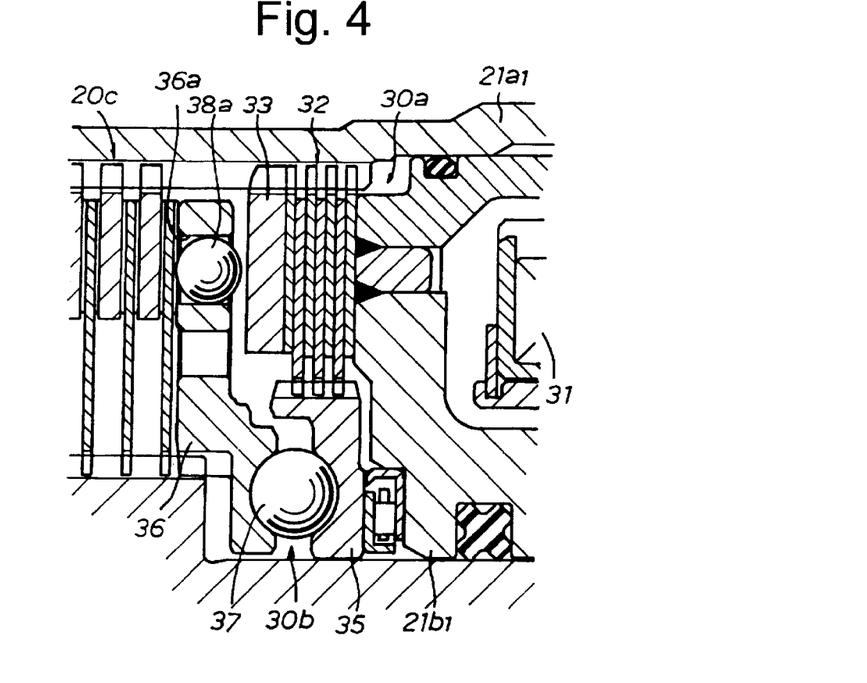
FIG. 4 is a fragmentary cross-sectional view showing a pilot clutch mechanism and a cam mechanism according to a second embodiment of the present invention.

At a second embodiment that is shown by FIG. 4, only the first regulator is adapted and the second regulator is omitted comparing to the first embodiment. Similarly with the first embodiment, the first regulator is plural balls 38a that are made of nonmagnetic substance and disposed into ball holes 36a formed on the second cam member 36.

Figure 5:
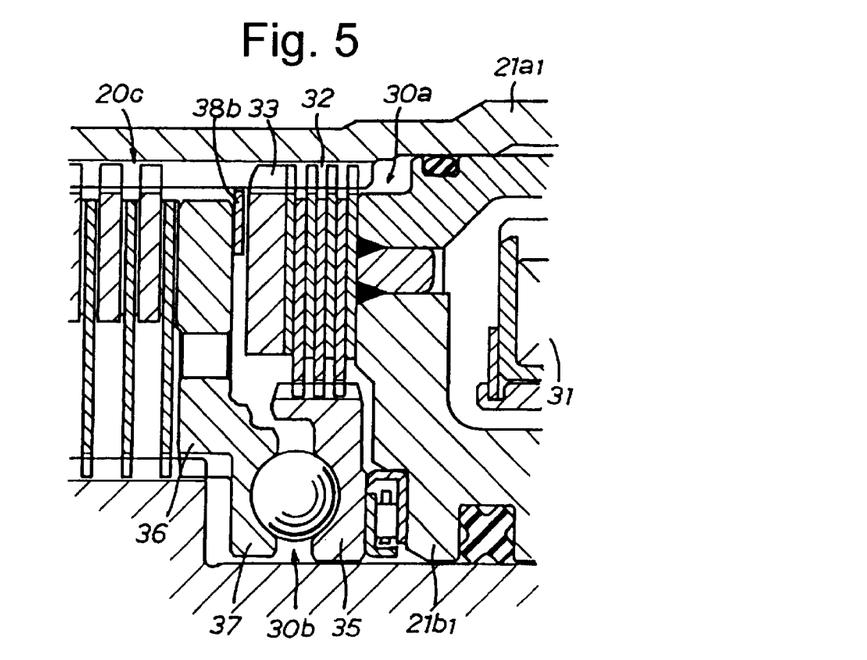
FIG. 5 is a fragmentary cross-sectional view showing a pilot clutch mechanism and a cam mechanism according to a third embodiment of the present invention.

At a third embodiment that is shown by FIG. 5, as the first regulator, a thin width ring 38b that is made of nonmagnetic substance is disposed between the armature 33 and the second cam member 36.

Figure 6:
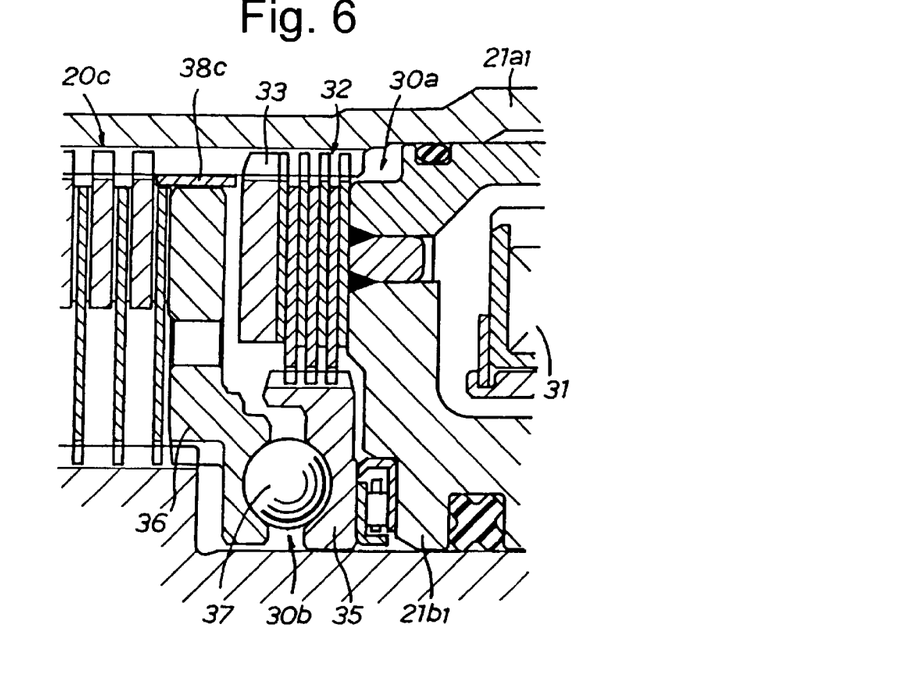
FIG. 6 is a fragmentary cross-sectional view showing a pilot clutch mechanism and a cam mechanism according to a forth embodiment of the present invention.

At a forth embodiment that is shown by FIG. 6, as the first regulator, a thick width ring 38c that is made of nonmagnetic substance is disposed around the second cam member 36 between the armature 33 and the main clutch mechanism 20c. In the forth embodiment, width of the ring 38c is wider than width of the second cam member 36.

Figure 7:
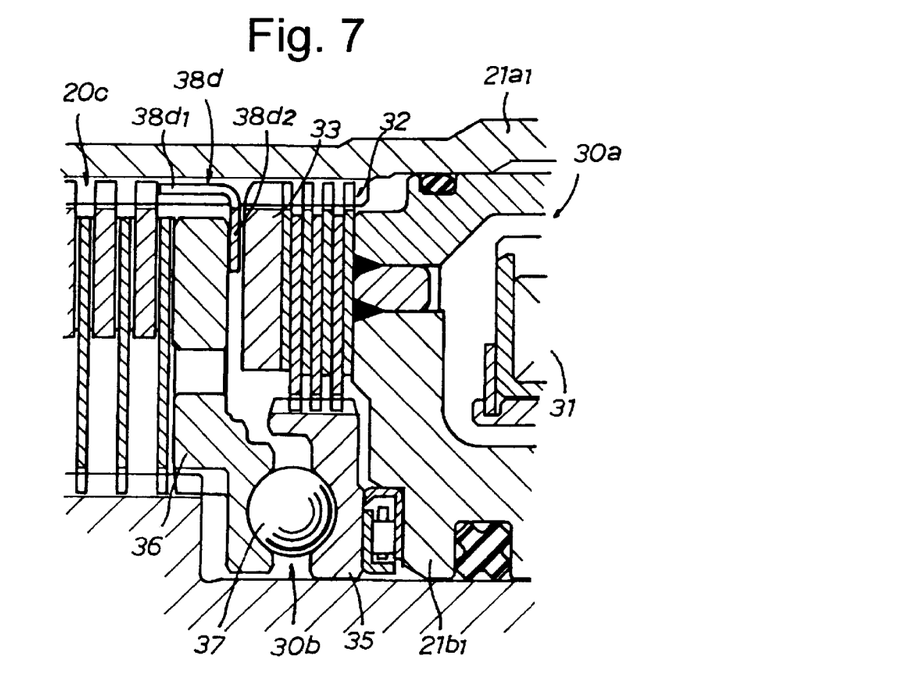
FIG. 7 is a fragmentary cross-sectional view showing a pilot clutch mechanism and a cam mechanism according to a fifth embodiment of the present invention.

At a fifth embodiment that is shown by FIG. 7, as the first regulator, a spring 38d that is made of nonmagnetic substance is adapted. The spring 38d is integrally formed of a disk-shape spring portion 38d2 and plural leg portions 38d1. The leg portions 38d1 are engaged to the inward spline 21a4 formed on the housing 21a of the outer case 20a to be disposed the spring portion 38d2 between the armature 33 and the second cam member 36.

Figure 8:
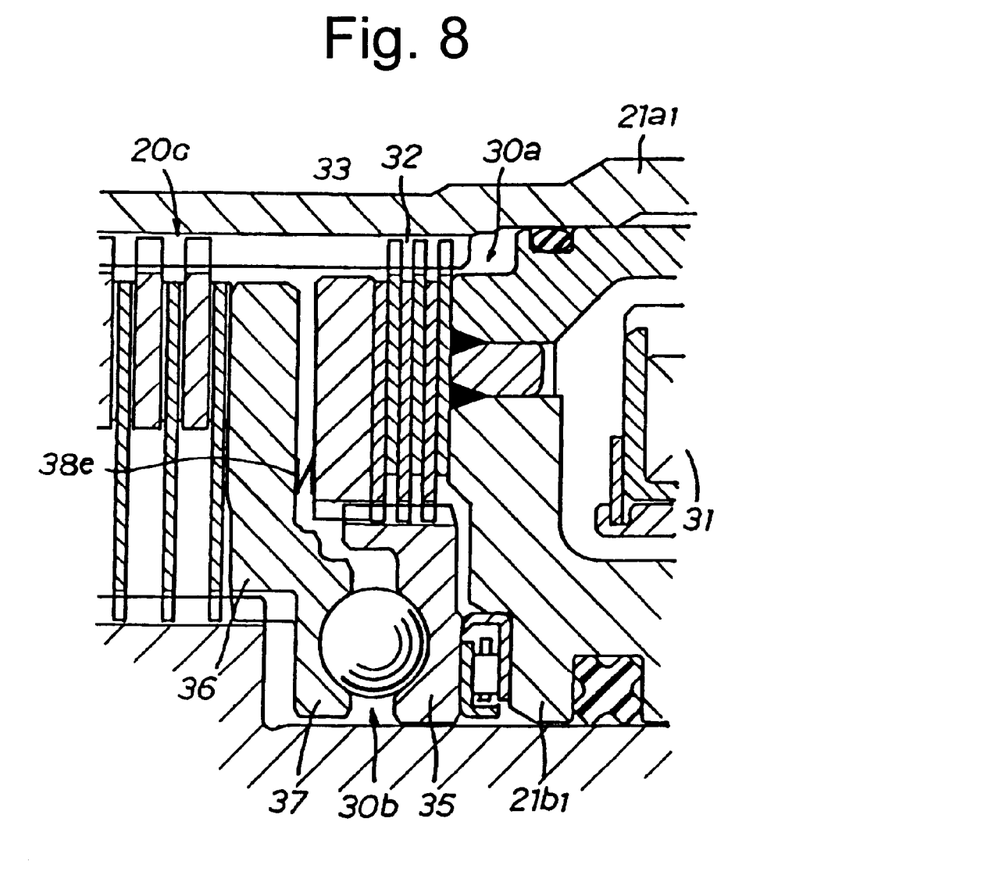
FIG. 8 is a fragmentary cross-sectional view showing a pilot clutch mechanism and a cam mechanism according to a sixth embodiment of the present invention.

At a sixth embodiment that is shown by FIG. 8, as the first regulator, a coned disc spring 38e that is made of nonmagnetic substance is disposed between the armature 33 and the second cam member 36. In the sixth embodiment, the armature 33 is engaged to the outer spline 35a formed on the first cam member 35 so as to avoid rotation of the armature 33 relative to the inner clutch plates 32b.

According to the other embodiments, the clearance between the armature 33 of the pilot clutch mechanism 30a and the second cam member 36 is kept more than a predetermined distance by operations of the first regulators so that the pilot clutch mechanism 30a is maintained to operate well.

Obviously, numerous modification and variations of the present invention are possible in light of the above teaching. It is therefore to be understood that within the scope of the appended claims, the present invention may be practiced otherwise than as specifically described herein.

What is claimed is:

1. A driving force transmission device, which transmits driving force between two rotary members, comprising:
    an outer case connecting to the one rotary member, the outer case is made of magnetic substance;
    an inner shaft connecting to the other rotary member and arranging into the outer case;
    a main clutch mechanism transmitting driving force between the outer case and the inner shaft,
    an electromagnetic type pilot clutch mechanism controlling operation of the main clutch mechanism, the pilot clutch mechanism comprises an electromagnet and an armature;
    a cam mechanism amplifying output of the pilot clutch mechanism and transmitting amplified output to the main clutch mechanism; and
    a first regulating member adjusting a clearance between the cam mechanism and the armature to be more than a predetermined distance, the first regulating member is made of nonmagnetic substance.

2. A driving force transmission device according to claim 1, wherein:
    the main clutch mechanism comprises at least one outer clutch plate assembled with the outer case and at least one inner clutch plate assembled with the inner shaft; and
    the inner clutch plate and the outer clutch plate of the main clutch mechanism are opposed each other and frictionally engaged each other according to operation of the cam mechanism.

3. A driving force transmission device according to claim 1, wherein:
    the pilot clutch mechanism further comprises a friction clutch which consists of at least one outer clutch plate assembled with the outer case and at least one inner clutch plate assembled with the cam mechanism; and
    the outer clutch plate and the inner clutch plate of the friction clutch are frictionally engaged according to movement of the armature.

4. A driving force transmission device according to claim 3, wherein:
    the cam mechanism comprises a first cam member assembling the inner clutch plate, a second cam member acting to the main clutch mechanism and a cam follower disposed between the first cam member and second cam member; and
    the second cam member acts to the main clutch mechanism when the first cam member and the second cam member relatively rotate according to engaging condition of the friction clutch.

5. A driving force transmission device according to claim 4, wherein the first regulating member adjusts a clearance between the second cam member and the armature to be more than a predetermined distance.

6. A driving force transmission device according to claim 5, wherein the first regulating member is at least one ball which is disposed into a hole formed on the second cam member and opposed to the armature.

7. A driving force transmission device according to claim 5, wherein the first regulating member is a ring disposed between the second cam member and the armature.

8. A driving force transmission device according to claim 5, wherein the first regulating member is a ring disposed around the second cam member and between the main clutch mechanism and the armature, width of the ring is wider than width of the second cam member.

9. A driving force transmission device according to claim 5, wherein the first regulating member is a spring consisted of a leg portion and a disk spring portion, the leg portion is engaged to the outer case and the disk spring portion is positioned between the second cam member and the armature.

10. A driving force transmission device according to claim 5, wherein:
    the first regulating member is a coned disc spring disposed between the second cam member and the armature; and
    the armature is engaged to the first cam member to be able to move axially and to be not able to rotate.

11. A driving force transmission device, which transmits driving force between coaxially disposed two rotary members, comprising:
    an outer case connecting to the one rotary member, the outer case is made of magnetic substance;
    an inner shaft connecting to the other rotary member and arranging into the outer case;
    a main clutch mechanism transmitting driving force between the outer case and the inner shaft;
    an eletromagnetic type pilot clutch mechanism controlling operation of the main clutch mechanism, the pilot clutch mechanism comprising an electromagnet and a friction clutch;
    a cam mechanism amplifying output of the pilot clutch mechanism; and
    a first regulating member disposed between the cam mechanism and the friction clutch to adjust an axial position of the friction clutch.

12. A driving force transmission device according to claim 11, wherein:
    the main clutch mechanism comprises at least one outer clutch plate assembled with the outer case and at least one inner clutch plate assembled with the inner shaft; and
    the inner clutch plate and the outer clutch plate of the main clutch mechanism are opposed each other and frictionally engaged each other according to operation of the cam mechanism.

13. A driving force transmission device according to claim 11, wherein:
    the friction clutch consists of at least one outer clutch plate assembled with the outer case and at least one inner clutch plate assembled with the cam mechanism; and
    the pilot clutch mechanism further comprises an armature, the outer clutch plate and the inner clutch plate of the friction clutch are frictionally engaged according to movement of the armature.

14. A driving force transmission device according to claim 13, wherein:

the cam mechanism comprises a first cam member assembling the inner clutch plate, a second cam member acting to the main clutch mechanism and a cam follower disposed between the first cam member and second cam member; and the second cam member acts to the main clutch mechanism when the first cam member and the second cam member relatively rotate according to engaging condition of the friction clutch.

15. A driving force transmission device according to claim 14, wherein the first regulating member is disposed between the second cam member and the friction clutch to apply a preload to the friction clutch to adjust an axial position of the outer and inner clutch plates of the friction clutch.

16. A driving force transmission device according to claim 15, wherein the first regulating member is a coil spring.

17. A driving force transmission device, which transmits driving force between coaxially disposed two rotary members, comprising:

an outer case connecting to the one rotary member, the outer case is made of magnetic substance;

an inner shaft connecting to the other rotary member and arranging into the outer case coaxially;

a main clutch mechanism transmitting driving force between the outer case and the inner shaft;

an electromagnetic type pilot clutch mechanism controlling operation of the main clutch mechanism, the pilot clutch mechanism comprising an electromagnet, an armature and a friction clutch;

a cam mechanism amplifying output of the pilot clutch mechanism and transmitting amplified output to the main clutch mechanism;

a first regulating member adjusting a clearance between the cam mechanism and the armature to be more than a predetermined distance; and a second regulating member adjusting an axial position of the friction clutch.

18. A driving force transmission device according to claim 17, wherein:

the main clutch mechanism comprises at least one outer clutch plate assembled with the outer case and at least one inner clutch plate assembled with the inner shaft; and the inner clutch plate and the outer clutch plate of the main clutch mechanism are opposed each other and frictionally engaged each other according to operation of the cam mechanism.

19. A driving force transmission device according to claim 17, wherein:

the friction clutch consists of at least one outer clutch plate assembled with the outer case and at least one inner clutch plate assembled with the cam mechanism; and the outer clutch plate and the inner clutch plate of the friction clutch are frictionally engaged according to movement of the armature.

20. A driving force transmission device according to claim 19, wherein:

the cam mechanism comprises a first cam member assembling the inner clutch plate, a second cam member acting to the main clutch mechanism and a cam follower disposed between the first cam member and second cam member; and the second cam member acts to the main clutch mechanism when the first cam member and the second cam member relatively rotate according to engaging condition of the friction clutch.

21. A driving force transmission device according to claim 20, wherein:

the first regulating member adjusting a clearance between the second cam member and the armature to be more than a predetermined distance; and the second regulating member puts preload between the first cam member and the friction clutch.

22. A driving force transmission device according to claim 21, wherein:

the first regulating member is at least one ball which is disposed into a hole formed on the second cam member and opposed to the armature; and the second regulating member is a coil spring.

* * * * *